June 10, 1958

R. M. WEIDENMILLER ET AL 2,838,013

COOKIE FORMING MACHINE

Filed Feb. 21, 1956

Inventors
Robert M. Weidenmiller
Jack E. Weidenmiller

By Mann, Brown & McWilliams
Attorney

Inventors
Robert M. Weidenmiller
Jack E. Weidenmiller

By Mann, Brown & McWilliams
Attorney

June 10, 1958 R. M. WEIDENMILLER ET AL 2,838,013
COOKIE FORMING MACHINE
Filed Feb. 21, 1956
4 Sheets-Sheet 4
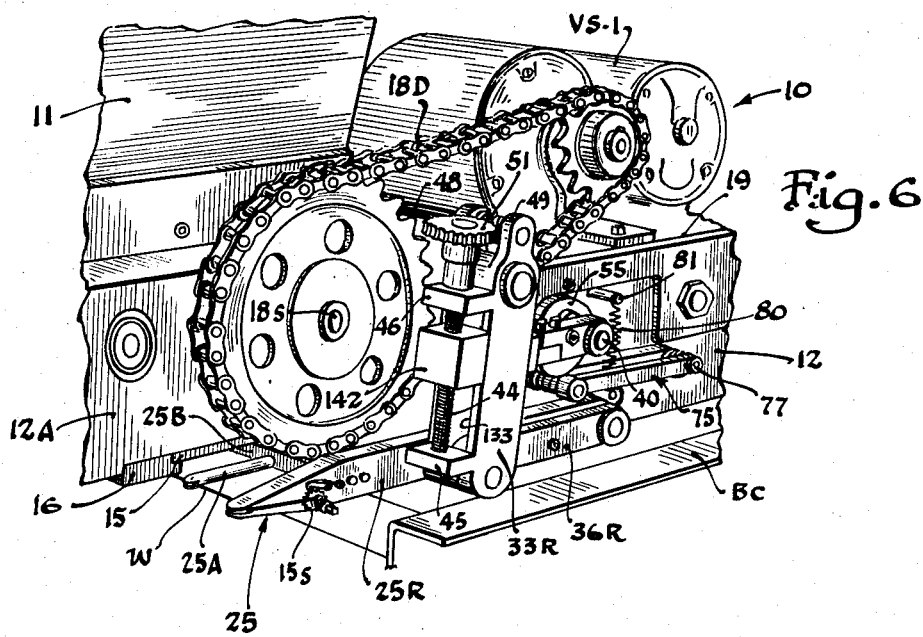
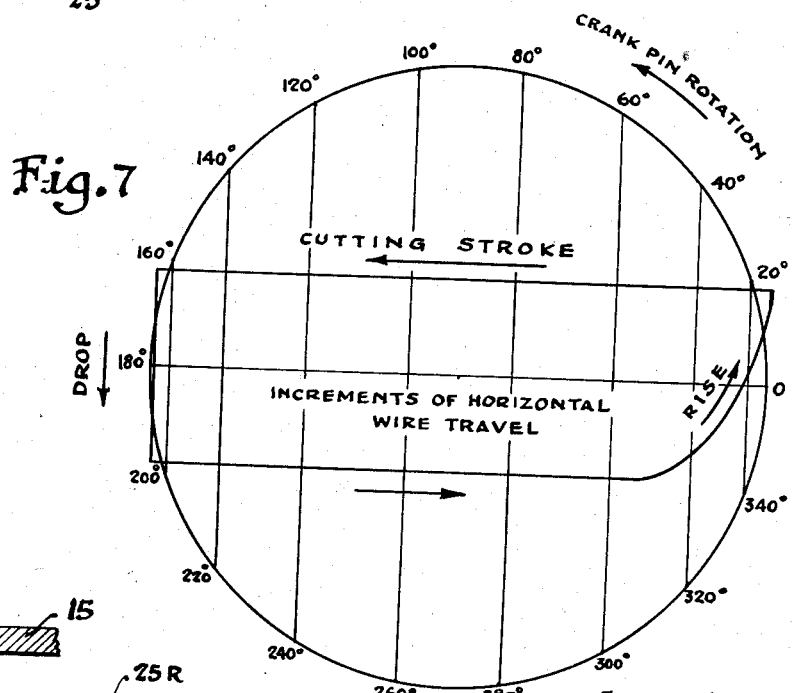
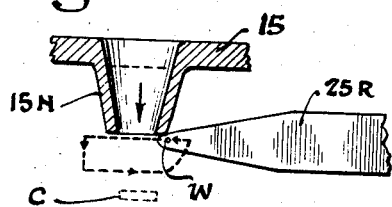
Inventors
Robert M. Weidenmiller
Jack E. Weidenmiller
By Mann, Brown & McWilliams
Attorney

United States Patent Office 2,838,013
Patented June 10, 1958

2,838,013

COOKIE FORMING MACHINE

Robert M. Weidenmiller, Northbrook, and Jack E. Weidenmiller, Chicago, Ill., assignors to Edward Weidenmiller Co., Inc., Chicago, Ill.

Application February 21, 1956, Serial No. 566,966

9 Claims. (Cl. 107—29)

This invention relates to cookie forming machines and particularly to such machines of the wire-cut type.

In cookie machines of the wire-cut type, the dough is supplied to an open topped hopper, the bottom of which is defined primarily by a pair of parallel longitudinally grooved feed rolls that are driven synchronously in opposite directions so as to feed the dough downwardly between the rolls and toward an extrusion plate that has a plurality of downwardly opening extrusion nozzles that terminate in a common horizontal plane, and the dough that is extruded at a continuous rate from these nozzles is periodically cut into thin slices or pieces that constitute cookies and which drop onto the usual pan or conveyor so that they may be transported to the oven for baking.

In machines of the wire-cut type this cutting operation is performed by a wire that is stretched beneath the hopper parallel to the plane of the lower ends of the extrusion nozzles and extending longitudinally of the line of nozzles, and the wire is moved through periodic cutting cycles to produce the cookies as above described. Such a cutting cycle of the wire includes a horizontal cutting stroke in which the wire is moved along or across the lower ends of the nozzles so as to sever the lower portion of the extruded material from the main body thereof, and after the cookie blank has thus been severed, the cookie blank drops downwardly fairly rapidly or is started on its downward movement by the downward movement of the wire that is necessary at this time in the cycle. This downward movement of the wire at the end of its cutting stroke is necessary in order that the wire may clear the constantly extruded material as the wire returns to its initial position. Thus, after the cutting stroke, the cycle next includes a lowering movement of the wire, a return movement of the wire, and finally a raising movement which returns the wire to its cutting plane and puts it in position for performance of the next cookie cutting stroke.

Prior wire-cut machines have in most instances produced the desired cookie cutting cycle of the cutting wire through the use of cam means which also involved relatively large and heavy cam and cam follower means that were costly to produce and operate, and which were exceedingly noisy and subject to extreme wear in continued use of the machine. Such prior machines have had a limited usefulness because of such noise and because of the difficulty of adapting the machine to different cookie sizes and to different production or cutting speeds.

It is therefore the primary object of the present invention to simplify wire-cut cookie machines and particularly to simplify and improve the wire supporting and actuating means. Other and further objects of the present invention are to enable cam operated wire supporting and actuating means to be more readily adjusted as to speed, frequency and extent of stroke, and to enable rapid operation to be attained without objectionable vibration or noise.

Further and more specific objects of the present invention are to enable the wire supporting and actuating means to be operated by noise-free cam means and to accomplish this in such a way that the drop movement of the wire and the stroke of the wire may be coordinated with the desired operating speed to attain smoothness of machine operation, perfection of the cookie depositing or dropping action, and freedom from noise and vibration.

Other and further objects of the present invention will be apparent from the following description and claims, and are illustrated in the accompanying drawings, which, by way of illustration, show a preferred embodiment of the present invention and the principles thereof, and what we now consider to be the best mode in which we have contemplated applying these principles. Other embodiments of the invention embodying the same or equivalent principles may be used and structural changes may be made as desired by those skilled in the art without departing from the invention.

In the drawings:

Fig. 3A is a fragmental vertical sectional view taken along the line 3A—3A of Fig. 3;

Fig. 6 is another perspective view of the operating mechanism on one side of the machine;

Fig. 7 is a chart showing the wire cycle; and

Fig. 8 is a vertical sectional view of a nozzle showing the relation of the wire cycle thereto.

Figure 1:
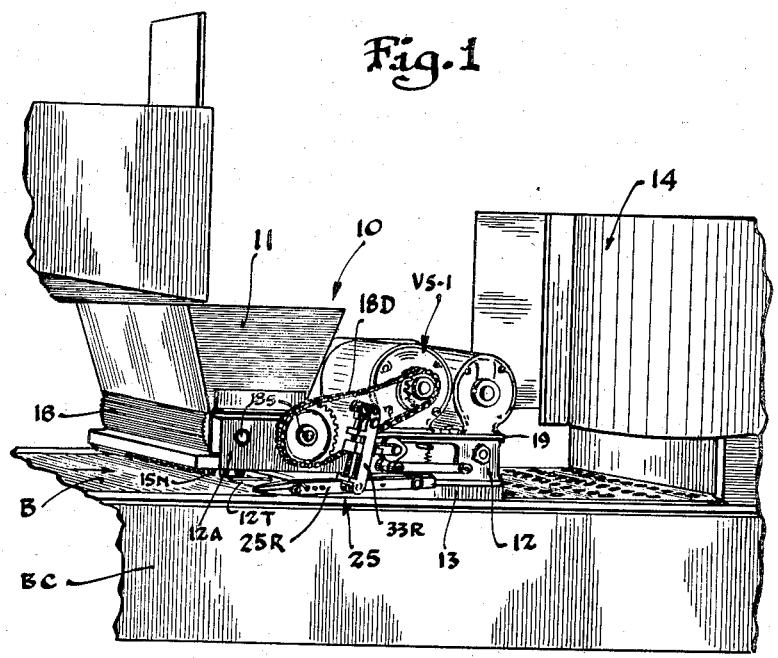
Fig. 1 is a perspective view of a wire-cut cookie forming machine embodying the features of the invention.

The invention is herein illustrated as embodied in a wire-cut cookie forming machine 10 having an open topped dough receiving hopper 11 that is carried upon projecting arms 12A of a pair of side frame plates 12, these side frame plates being rigidly fixed near their rear or right-hand ends to a pair of parallel base plates 13 that are relatively long and which extend for a considerable distance forwardly or to the left from the side frame plates 12. The base plates 13 are adapted to be mounted in the usual manner on the side frame elements of conventional bakery equipment such as a pan conveyor, or a steel band conveyor BC, as herein shown, the steel band conveyor B, of course, being of the type which serves as a supporting surface for the cookies as they are moved through an oven 14.

Figure 3:
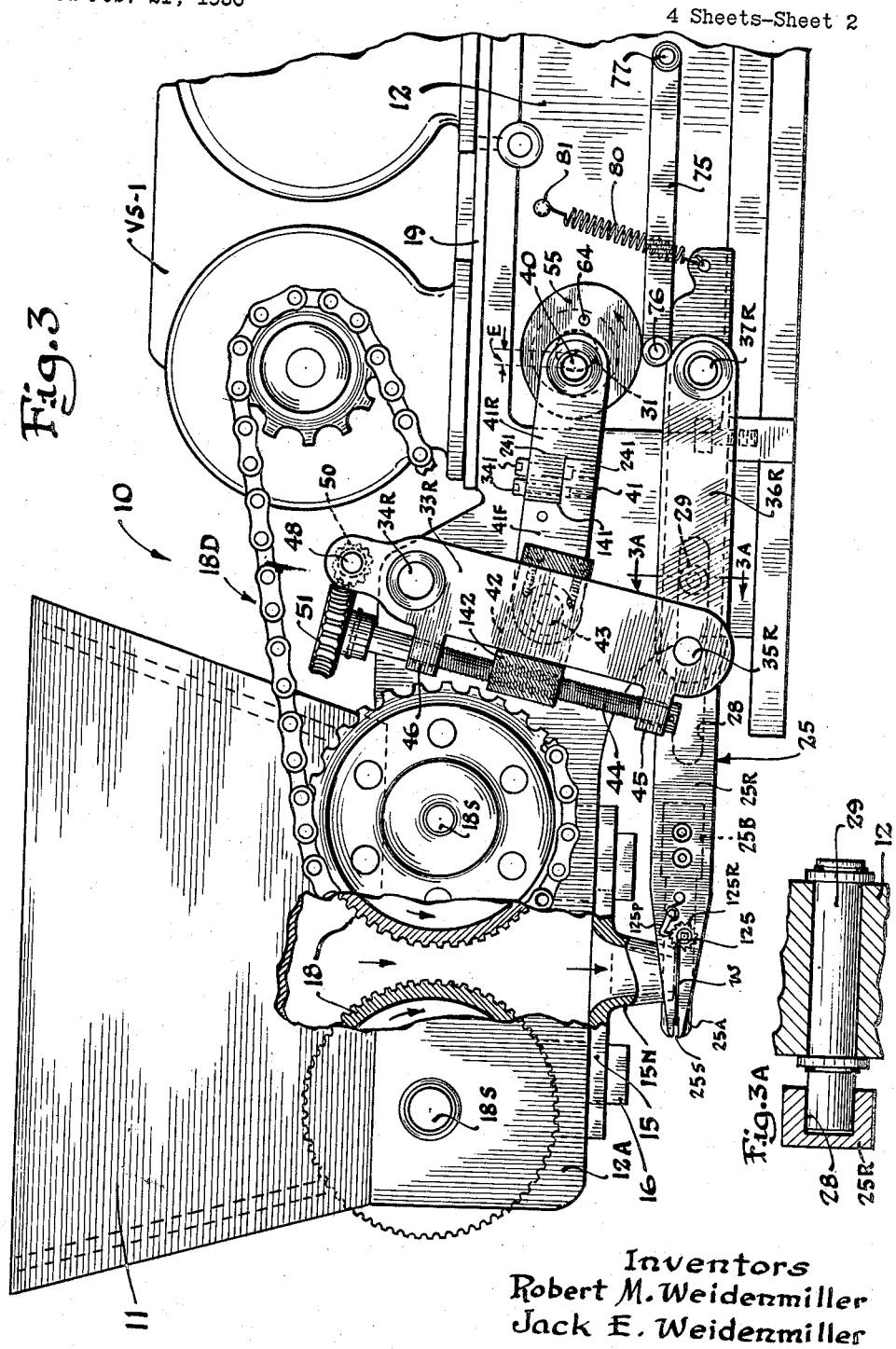
Fig. 3 is an enlarged side elevational view of the machine.
Figure 4:
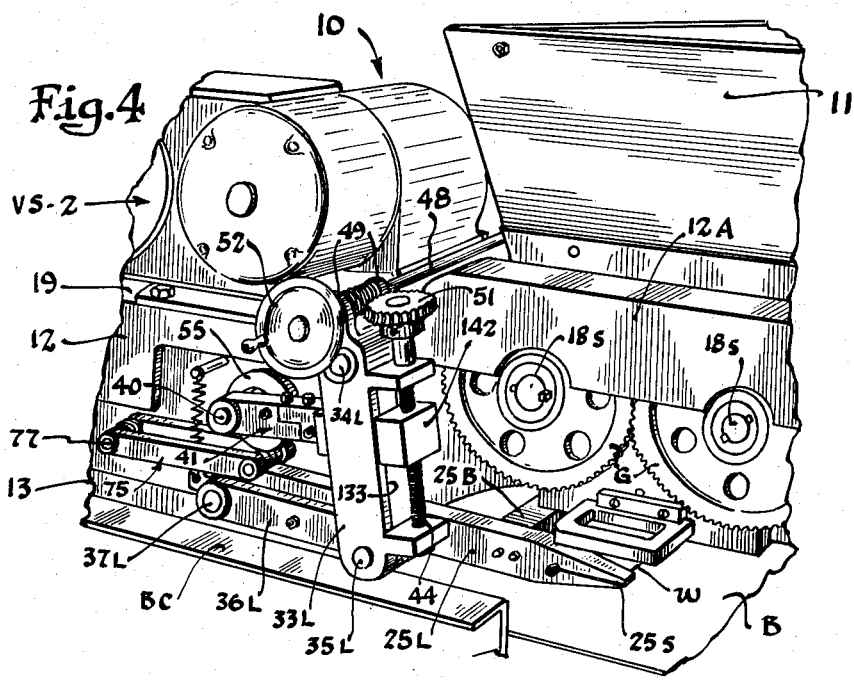
Fig. 4 is a perspective view of the actuating and wire supporting mechanism.

The extensions 12A of the side plates are spaced upwardly a considerable distance from the upper faces of the base plates 13, thus to provide a throat 12T, and on the upper edge of this throat 12T, as defined by the lower edge of the extensions 12A, an extrusion plate 15 is removably supported by means including brackets 16, Fig. 3. This extrusion plate 15 has a plurality of downwardly extending tapered nozzles 15N that terminate in lower ends that are disposed in a common horizontal plane, and this structure is conventional in character and provides for variation in the size, number and shape of extrusion openings. The hopper 11 is, in the use of the machine, filled with dough and such dough rests upon a pair of parallel grooved feed rolls 18 that are supported on drive shafts 18S that extend through the side frame extensions 12A, as will be evident in Figs. 1 and 4 of the drawings. Such feed rolls 18 are driven from a variable speed drive VS-1, such drive VS-1, along with a second variable speed drive VS-2, being carried on a mounting plate 19 that spans the side frames 12 adjacent the hopper 11, as will be evident in Fig. 1 of the drawings.

A chain drive 18D is extended from the output of the speed reducer VS-1 to the adjacent shaft 18S at one end thereof, and the other ends of the shafts 18S are geared together by gears G so as to rotate in unison and in opposite directions. The feed rolls 18 have their adjacent edges relatively close together, as shown in Fig. 3, and when rotated in the direction indicated by the arrows in Fig. 3, these rolls force the dough downwardly and with a uniform action toward the extrusion nozzles 15N.

The dough that is forced downwardly by the rolls 18 is thus extruded from the several nozzles 15N at a uniform rate and in the shape and size that is determined by the particular extrusion plate that is in position in the machine. As the dough is thus being constantly extruded from the nozzles 15N, the dough is cut periodically in a horizontal plane by the action of a cutting wire W so as to produce a cookie C which drops downwardly from its nozzle as indicated in dotted outline in Fig. 8 of the drawings. Under and in accordance with the present invention the cutting wire W is mounted and actuated in such a way that the machine is substantially noise-free and may be used in forming dough of widely varying characteristics and may be operated at high speed.

Thus, a wire-supporting frame 25 is provided that has parallel and generally horizontal arms 25R and 25L at its opposite sides and these arms are connected by a rigid cross bar 25B. The cross bar 25B is located a substantial distance forwardly or to the left, Fig. 4, with respect to the rear ends of the arms 25L and 25R, and at their rear ends these arms have longitudinal slots 25S formed therein so that a wire may be extended through these slots and may be tensioned so as to afford an effective cutting element. In the present instance the wire W is anchored on the left-hand arm 25L and is extended through the slot 25S of this arm, across the space between the two arms and through the slot 25S of the right-hand arm, and is then extended about a winding drum mechanism 125 that includes a ratchet 125R and a securing pawl 125P as shown in Fig. 3 of the drawings. By rotating the winding drum in a conventional manner, the wire W may be properly tensioned. Since machines of this character are relatively wide, the wire W is also supported at spaced points throughout its length and this is accomplished by providing a plurality of arms 25A fixed to the cross bar 25B and extending rearwardly from the bar parallel to the arms 25L and 25R. These intermediate arms 25A are spaced so as to be located between the several extrusion nozzles 15N, and at their rear ends the arms 25A are notched so as to embrace the wire W. Thus, the arms 25A afford vertical support for the wire W and also afford support for imparting pushing movement to the wire W at spaced points during actual cutting stroke.

Under the present invention the wire supporting frame 25 is supported and actuated by mechanical means that provides for convenient changes not only in the stroke length but also in the drop of the wire. Thus the frame 25 has its opposite arms extended rearwardly along the outer faces of the side frames 12 and intermediate their ends the arms 25R and 25L have longitudinally extended slots 28 cut into their inner surfaces, as shown in Figs. 3 and 3A. Each of these slots 28 serves to receive the extended end of an outboard roller 29 that is rotatably mounted in the adjacent side frame 12, as shown in Fig. 3A, and the end of the roller 29 is fitted into its slot 28 with a very slight clearance so that the roller 29 serves to very accurately determine the vertical position of that point or part of the slot 28 that engages the roller. The length of the slots 28 is such as to provide for reciprocation of the frame 25 through the desired maximum length of stroke, and during such reciprocation the position of the rear ends of the arms, or right-hand ends in Fig. 3, is controlled to raise and lower the wire W and produce the desired cycle of wire movement. Thus the frame 25 is moved through a combined reciprocating and rocking motion, as will be described.

Figure 2:
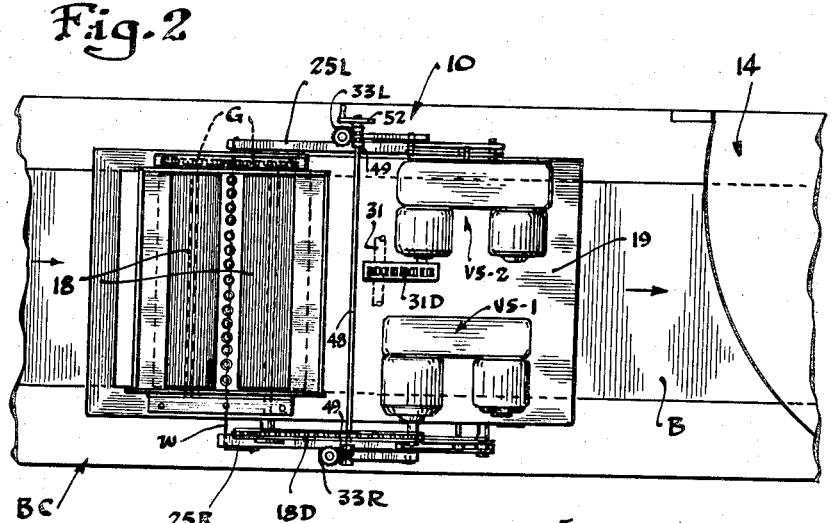
Fig. 2 is a plan view of the machine.
Figure 5:
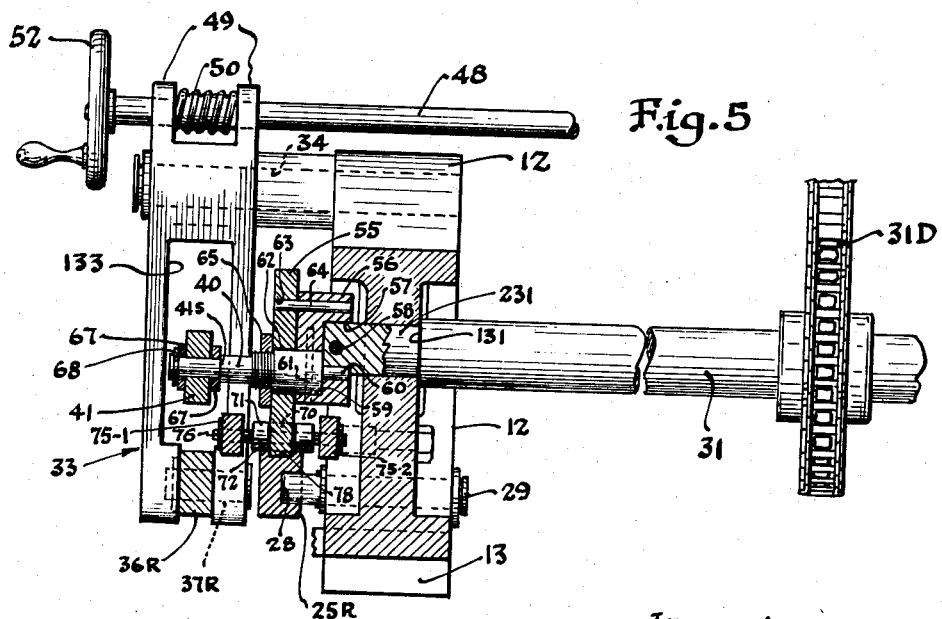
Fig. 5 is a vertical sectional view through the cam mechanism of one side of the machine.

The operating power for the actuation of the wire carrying frame 25 is provided by the variable speed drive VS-2 which, as shown in Figs. 2 and 5, has its output connected by a chain drive 31D that extends down through the plate 19 to a transverse shaft 31 that extends between and through the opposite side frames 12 and is rotatably supported therein over the rear end portions, or right-hand end portions, as shown in Fig. 3, of the arms 25R and 25L. The shaft 31 is utilized for imparting both the reciprocating and rocking components of movement to the frame 25, and corresponding operating connections are provided between opposite ends of the shaft 31 and the respective arms 25R and 25L so that noise-free and trouble-free operation may be assured.

Thus, as shown in Figs. 3 to 6, the reciprocating motion is provide by rocking arms 33R and 33L which are individually pivoted near their upper ends on aligned pivot pins 34R and 34L, and the lower ends of the arms 33R and 33L extend downwardly to substantially the lower edges and along the outer faces of the respective arms 25R and 25L. At their lower ends the rocking arms 33R and 33L have pivot pins 35R and 35L from which identical links 36R and 36L are extended rearwardly toward the rear ends of the arms 25R and 25L to which the rear ends of such links are pivoted by pivot pins 37R and 37L. Hence, by rocking the rocking levers 33R and 33L in unison, as will be described, the frame 25 may have the desired component of reciprocation imparted thereto, and during such reciprocation, rocking movement of the frame may take place, or is permitted, because of use of the links 36R and 36L.

The rocking movements are imparted to the rocking levers 33R and 33L in unison by similar connections of these rocking levers to the corresponding ends of the drive shaft 31. Thus, each end of the drive shaft is arranged to carry an eccentric pin 40, and the particular manner of mounting thereof will be described hereinafter, and these pins 40 are connected by transmitting links 41 to the rocking levers 33R and 33L. Such connection of the links 41 to the rocking levers is accomplished in such a way that the rocking stroke of the levers may be adjusted, and in accomplishing this the rocking levers are formed with longitudinal slots 133 therein as will be evident in Figs. 4 and 5 of the drawings. These slots 133 provide for the mounting of bearing blocks 42 to which the forward ends of the links 41 are respectively pivoted by pivot pins 43. The blocks 42 have forwardly projecting portions 142 that are formed as nuts, and adjusting screws 44 are extended through these nuts parallel to the slots 133. The adjusting screws 44 are mounted on the respective rocking arms 33R and 33L by means including projecting lugs 45 and 46 that are formed on the forward faces of the rocking arms below and above the respective ends of the slots 133. Thus, by operation of the adjusting screws 44, the blocks 42 may be adjusted toward and away from the pivot pins 34R and 34L so as to vary the extent of rocking movement of the rocking arms.

Such adjustment of the bearing blocks 42 is accomplished in unison by means of a common adjusting connection for the two screws. Thus, an adjusting shaft 48 is extended across the machine and is supported at its opposite ends in spaced bearing lugs 49 that are formed at the upper ends of each of the rocking arms as will be evident in Figs. 4 and 5. Between the lugs 49 on each of the rocking arms, the shaft 48 has a worm gear 50, and these worms 50 are meshed with similar worm wheels 51 that are pinned to the upper ends of the respective adjusting screws 44. A hand wheel 52 on one end of the shaft 48 facilitates rotation of the shaft so that adjustment of the two bearing blocks in unison may be readily and easily accomplished. The worm and worm wheel connection between the shaft 48 and the screws 44 acts of course to provide a self-locking action which maintains the parts in the adjusted positions to which they have been set.

The way in which the eccentric drive pins 40 are mounted on the shaft 31 is best illustrated in Fig. 5 of the drawings, and it should be noted that these drive pins also function, as will hereinafter be described, in providing for ready mounting and dismounting of control cams 55 on the respective ends of the shaft 31 so that these cams may act to impart the desired rocking movements to the frame 25. Thus, each end of the shaft 31 is shouldered at 131 and the reduced end portion 231 thereof extends through rotatable bearings provided in the respective side frame members 12. The reduced end 231 extends for a short distance beyond the outer face of the frame member and has a drive hub 56 fixed thereon. In accomplishing this the hub 56 has an axial bore 57 extended partially therethrough and the end of the reduced portion 231 extends into and is bottomed in the bore 57, a transverse pin 58 serving to secure the hub 56 in position on the reduced end 231. The other or outer face of the hub 56 has an eccentrically located bore 59 formed therein to such a depth that it opens into the bottom of the bore 57 at one side of this bore, and this enables a keyway to be formed at one side of the axial bore 57 to receive a key 60.

The bore 59 serves as a mounting for the pin 40, and as will be evident in Fig. 5 of the drawings, the base portion of the pin 40 has a snug fit within the bore 59 and is fixed therein by means of a pin 61.

As mentioned hereinbefore, the pin 40 is utilized in mounting the cam 55 adjacent each one of the hubs 56. Thus, it may be observed that the cams 55 are of identical contour but are made in right and left-hand forms, and each cam has an opening 62 therein that fits snugly over the enlarged base portion of the pin 40. Each cam 55 also has an opening or bore 63 adjacent an opposite side thereof that may slip snugly over a locating pin 64 that is fixed in the hub 56 as shown in Fig. 5. After a cam 55 has been put in position over the pins 40 and 64, it is held in place and against the end face of the hub 56 by a nut 65 that is threaded on to the pin 40. Outwardly of the screw-threaded portion thereof, the pin 40 is slightly reduced in diameter, and to provide a mounting for the link 41, the pin is shouldered at 41S. The link 41 is positioned between two washers 67 on the outer or reduced end portion of the pin 40, and outwardly of the outermost washer 67, the pin 40 is grooved to receive a retaining means such as C-washer 68.

The mounting that is thus provided simplifies the replacement of the cams 55 since the C-washer 68 may be removed, and after removal of the links 41 and the nuts 65, the cams 55 may be removed. In order to simplify the removal of the links 41 under such circumstances, these links are under the present invention made in separable sections as will be evident particularly in Figs. 3 and 4 of the drawings. Thus, front and rear sections 41F and 41R of these links are formed with what amount to half-lap joints 141 that have overlapping arms 241 that are arranged one on top of the other, and vertical securing screws 341 are extended downwardly through these overlapped arm portions 241 so that the arm portions may be releasably secured together. Then when the link 41 is to be disconnected or removed from the related pin 40, the two sections 41F and 41R of the link are disconnected thus to leave the link section 41F in position while the link section 41R may be freely removed from the pin 40.

The cams 55 function, as hereinbefore described, to impart the desired rocking movements to the frame 25, and these cams are therefore in the form of edge cams which act on the arms 25R and 25L through transmitting rollers 70 and 71 to accomplish this purpose, the roller 70 bearing against the cam 55 while the two rollers 71 bear against surfaces 72 formed along the edge or border portions of the upper face of the related arm 25R or 25L. The cam rollers 70 and 71 are carried on a rocking frame 75 in each instance, such frame comprising spaced arms 75—1 and 75—2, and the mounting of the rollers being accomplished by a transverse pin 76 at one end thereof. The other or rear end of each mounting frame is pivoted on a pivot pin 77 extending outwardly from the adjacent side frame 12. As will be evident in Fig. 5 of the drawings, the upper surface of the arm 25R or 25L has a longitudinal groove 78 formed therein at a point opposite the roller 70 thus to prevent contact of this roller with the arm 25R or 25L. Similarly, the rollers 71 are disposed outwardly of the opposite faces of the cam 55 so that they engage the respective surfaces 72 but do not contact the cam. Hence, the rollers 71 may oscillate or rotate in opposite directions as the frame 25 is moved back and forth through its reciprocating movements, while the central roller 70 may rotate constantly in the same direction as it rolls over the surface of the cam 55. The rear ends of the arms 25R and 25L are urged upwardly toward the rollers 71 and the cam 55 by springs 80 that are connected to the rear ends of the respective arms 25R and 25L and to anchoring pins 81 mounted on the side frames 12.

The cams 55 are so formed that the downward or dropping movement of the wire is accomplished quite rapidly and while the horizontal movements of the wire are relatively slow, and this will be evident in Fig. 7 of the drawings. In Fig. 7 the horizontal increments of movement of the wire W are in effect plotted against the rotative increments of movement of the main shaft 31, and this same relationship is also shown in respect to the up and down movements of the wire W. Thus, at the opposite ends of the stroke of the wire W, the horizontal movements of the wire are relatively slow, and the cams 55 are so formed that the dropping movement of the wire W occurs in the space of time when the horizontal rate of movement is the smallest and after the wire has completed its cutting action. This time increment occupies substantially 40° of the rotative cycle of the shaft 31, and the cam is so formed that the downward movement of the wire is quite rapid. This is important in many instances, particularly where the dough that is being used is of such a kind that it tends to stick to the cutting wire. The quick initiation of the downward movement of the wire thus tends to accelerate the downward discharge of the cookie and causes the cookie dough to become disengaged from the wire. Moreover, the downward stroke is terminated abruptly, as indicated in Fig. 7, so that in the event the cookie has not as yet disengaged from the wire, its downward inertia will cause this disengagement to take place in a uniform manner at the time of the abrupt termination of the downward stroke of the wire. The wire is then withdrawn or returned along a substantially horizontal path, but its upward movement is started a considerable time before the wire reaches the end of its return stroke. Thus, as herein shown, such return movement in an upward direction, or in other words the rising movement of the wire, starts at about 305° of the cycle, and the rising movement is relatively gradual so that the wire reaches its upper position shortly before the shaft 31 reaches its 20° position in its cycle.

Through this arrangement the machine is caused to operate quietly at high operating speeds, and the attainment of high operating speeds is under the present invention further facilitated through the use of the replaceable sets of cams 55 whereby the drop of the wire may be changed to conform to the different operating conditions that are encountered in this art. Thus, where thin cookies are being made the drop of the wire may be substantially reduced, thus to minimize the work that must be done in the rocking cycle of the cutting frame 25, and this of course enables higher speeds to be employed without objectionable machine noise or vibration.

From the foregoing description, it will be apparent that the present invention provides an improved wire cut cookie machine in which the reversing operating parts are of relatively low inertia and are actuated through their operating movements by noise-free mechanism that avoids strain or distortion of the parts and which may be adapted to the varying conditions that are encountered in the baking art.

Thus, while we have illustrated and described the invention in a particular embodiment, it will be recognized that changes and variations may be made within the spirit and scope of the invention.

We claim:

1. In a wire-cut cookie machine, spaced side frames, a hopper carried thereon with extrusion nozzles and means for exerting extruding forces on the dough, a cutter frame having side arms with a bridging cutting wire at one end thereof and said arms extending at their other ends along said side frames, said side frames having outwardly projecting aligned rollers, and said arms having elongated longitudinal slots in their inner faces riding on the respective rollers to support said cutter frame for reciprocating and rocking movements, a transverse drive shaft extended between and mounted in said side frames parallel to said wire, means including driving cranks on opposite ends of said shaft for reciprocating said side arms in unison, and means on said shaft at opposite ends thereof for correspondingly rocking said arms.

2. In a wire-cut cookie machine having spaced side frames with a hopper carried thereon with extrusion nozzles and opposed feed rolls operable to extrude dough-like material through said nozzles, a cutter frame having side arms with a cutting wire extended therebetween at one end thereof and said arms extending at their other ends along the outer sides of said side frames, said side frames having outwardly projecting aligned rollers, and said arms having elongated longitudinal slots in their inner faces riding on the respective rollers to support said cutter frame for reciprocating and rocking movements, a transverse drive shaft extended between and mounted in said side frames parallel to said wire, means including drive crank pins and connecting rods on opposite ends of said shaft for reciprocating said side arms in unison, cams fixed in symmetrical relation on said shaft at opposite ends thereof and surrounding said crank pins and having motion transmitting connections with said arms for rocking said arms in unison, and means securing said cams in matching positions on opposite ends of said shaft including said crank pins.

3. In a wire-cut cookie machine, spaced side frames having a hopper carried thereon with extrusion nozzles and opposed feed rolls operable to extrude dough-like material through said nozzles, a cutter frame having side arms with a cutting wire extended therebetween at one end thereof and said arms extending at their other ends along the outer sides of said frames, said side frames having outwardly projecting aligned rollers, and said arms having elongated longitudinal slots in their faces riding on the respective rollers to support said cutter frame for reciprocating and rocking movements, a transverse drive shaft extended between and mounted in said side frames parallel to said wire, rocking frames on opposite sides of said side frames connected to said side arms for reciprocating the same in unison, corresponding crank pins on opposite ends of said shaft, sectional connecting rods each having one section thereof connected to one of said rocking frames and having its other section detachably connected to one of said drive pins, said sections being detachably secured together, cams on said shaft at opposite ends thereof and surrounding said crank pins and having motion transmitting connections with said arms for rocking said arms in unison, and means securing said cams in matching positions on opposite ends of said shaft including said crank pins.

4. In a wire-cut cookie machine, spaced side frames with a hopper carried thereon with extrusion nozzles and means to apply continuous extruding forces to dough in the hopper, a cutter frame having side arms with a cutting wire extended therebetween at one end thereof and said arms extending at their other ends along the outer sides of said frames, means supporting said arms on said side frames for reciprocating and rocking movements, a transverse drive shaft extended between and mounted in said side frames parallel to said wire, rocking frames on the outer sides of the respective side frames connected to said side arms for reciprocating the same in unison, bearing members mounted on the respective rocking frames for adjustment radially with respect to the rocking axis thereof, corresponding crank pins on opposite ends of said shaft, sectional connecting rods each having one section thereof connected to the bearing of one of said rocking frames and having its other section detachably connected to one of said drive pins, said sections being detachably secured together, cams on said shaft at opposite ends thereof for rocking said arms in unison, and means including said crank pins releasably securing said cams in matching positions on opposite ends of said shaft.

5. In a wire-cut cookie machine having spaced side frames with a hopper carried thereon with extrusion nozzles and means to apply continuous extruding forces to dough in the hopper, a cutter frame having side arms with a cutting wire extended therebetween at one end thereof and said arms extending at their other ends along the outer sides of said frames, means supporting said arms on said side frames for reciprocating and rocking movements, a transverse drive shaft extended between and mounted in said side frames parallel to said wire, rocking frames on the outer sides of the respective side frames connected to said side arms for reciprocating the same in unison, bearing members mounted on the respective rocking frames for adjustment radially with respect to the rocking axis thereof, corresponding crank pins on opposite ends of said shaft, sectional connecting rods each having one section thereof connected to the bearing of one of said rocking frames and having its other section detachably connected to one of said drive pins, means for adjusting the radial positions of said bearing members in unison, said sections of said connecting rods being detachably secured together, cams on said shaft at opposite ends thereof for rocking said arms in unison, and means including said crank pins releasably securing said cams in matching positions on opposite ends of said shaft.

6. In a wire-cut cookie machine having spaced side frames with a hopper carried thereon with extrusion nozzles and means to apply continuous extruding forces to dough in the hopper, a cutter frame having side arms with a cutting wire extended therebetween at one end thereof and said arms extending at their other ends along the outer sides of said frames, means supporting said arms on said side frames for reciprocating and rocking movements, a transverse drive shaft extended between and mounted in said side frames parallel to said wire, rocking frames on the outer sides of the respective side frames connected to said side arms for reciprocating the same in unison, bearing members mounted on the respective rocking frames for adjustment radially with respect to the rocking axis thereof, corresponding crank pins on opposite ends of said shaft, sectional connecting rods each having one section thereof connected to the bearing of one of said rocking frames and having its other section detachably connected to one of said drive pins, means comprising a transverse shaft mounted on and extending between said rocking frames for adjusting the radial positions of said bearing members in unison, sections being detachably secured together, cams on said shaft at opposite ends thereof for rocking said arms in unison, and means including said crank pins releasably securing said cams in matching positions on opposite ends of said shaft.

7. In a wire-cut cookie machine, spaced side frames having a hopper carried thereon with extrusion nozzles and opposed feed rolls operable to extrude dough-like material through said nozzles, a cutter frame having side arms with a cutting wire extended therebetween at one end thereof and said arms extending at their other ends along the outer sides of said frames, means supporting said arms on said side frames for reciprocating and rocking movements, a transverse drive shaft extended between and mounted in said side frames parallel to said wire, rocking frames on opposite sides of said side frames connected to said side arms for reciprocating the same in unison, corresponding crank pins on opposite ends of said shaft, sectional connecting rods each having one section thereof connected to one of said rocking frames and having its other section detachably connected to one of said drive pins, said sections being detachably secured together, locating pins on the respective ends of said shaft spaced laterally from said drive pins, cams on said shaft at opposite ends thereof for rocking said arms in unison, said cams having locating openings therein engaging said locating pins and said crank pins to locate said cams in matching positions on opposite ends of said shaft, and releasable means on said crank pins holding said cams in predetermined axial positions on said shaft.

8. In a wire-cut cookie machine, spaced side frames with a hopper carried thereon with extrusion nozzles and dough extruding means, a cutter frame having side arms with a cutting wire extended therebetween at one end thereof and said arms extending at their other ends along the outer sides of said frames, means supporting said arms on said side frames for reciprocating and rocking movements, a transverse drive shaft extended between and mounted in said side frames parallel to said wire, rocking frames on opposite sides of said side frames connected to said side arms for reciprocating the same in unison, mounting hubs fixed on opposite ends of said shaft for rotation therewith, corresponding crank pins mounted in the respective hubs, sectional connecting rods each having one section thereof connected to one of said rocking frames and having its other section detachably connected to one of said drive pins, said sections being detachably secured together, longitudinally projecting locating pins on said hubs spaced laterally from said crank pins, cams having locating openings therein embracing said locating pins and crank pins, removable means on said crank pins holding said cams in position on said pins and hubs, and cam rollers interposed between the respective cams and the upper surfaces of said side arms, and spring means maintaining said arms and said rollers in engagement and in cooperating engagement with said cams.

9. In a wire-cut cookie machine, spaced side frames with a hopper carried thereon with extrusion nozzles and dough extruding means, a cutter frame having a cutting wire thereon adapted for cutting the extruded dough into cookies, means supporting cutter frame on said side frames for movement through cutting cycles in each of which said wire is reciprocated horizontally and is lowered at one end of its reciprocating stroke and raised at the other end of such stroke, a transverse drive shaft extended between and mounted in said side frames parallel to said wire, rocking frames on opposite sides of said side frames connected to said frame imparting such reciprocation thereto, mounting hubs fixed on opposite ends of said shaft for rotation therewith, corresponding crank pins mounted in the respective hubs, sectional connecting rods each having one section thereof connected to one of said rocking frames and having its other section detachably connected to one of said drive pins, said sections being detachably secured together, longitudinally projecting locating pins on said hubs spaced laterally from said crank pins, cams having locating openings therein embracing said locating pins and crank pins, removable means on said crank pins holding said cams in position on said hubs, and cam rollers interposed between the respective cams and cutter frame, and spring means maintaining said cutter frame and said rollers in engagement and in cooperating engagement with said cams.

References Cited in the file of this patent
UNITED STATES PATENTS

| | | |
|---|---|---|
| 2,488,046 | Werner et al. | Nov. 15, 1949 |
| 2,667,130 | Kottman et al. | Jan. 26, 1954 |